United States Patent
Fuxman et al.

(10) Patent No.: US 11,907,337 B2
(45) Date of Patent: Feb. 20, 2024

(54) MULTIMODAL IMAGE CLASSIFIER USING TEXTUAL AND VISUAL EMBEDDINGS

(71) Applicant: Google LLC, Mountain View, CA (US)

(72) Inventors: Ariel Fuxman, Redwood City, CA (US); Aleksei Timofeev, Mountain View, CA (US); Zhen Li, Sunnyvale, CA (US); Chun-Ta Lu, Sunnyvale, CA (US); Manan Shah, Los Altos, CA (US); Chen Sun, San Francisco, CA (US); Krishnamurthy Viswanathan, Sunnyvale, CA (US); Chao Jia, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/046,313

(22) PCT Filed: Nov. 18, 2019

(86) PCT No.: PCT/US2019/061950
§ 371 (c)(1),
(2) Date: Oct. 9, 2020

(87) PCT Pub. No.: WO2020/102797
PCT Pub. Date: May 22, 2020

(65) Prior Publication Data
US 2021/0264203 A1    Aug. 26, 2021

Related U.S. Application Data

(60) Provisional application No. 62/768,701, filed on Nov. 16, 2018.

(51) Int. Cl.
*G06K 9/62* (2022.01)
*G06K 9/46* (2006.01)
(Continued)

(52) U.S. Cl.
CPC ............ *G06F 18/24* (2023.01); *G06F 18/214* (2023.01); *G06F 18/24147* (2023.01)

(58) Field of Classification Search
CPC ...... G06K 9/46; G06K 9/6256; G06K 9/6267; G06K 9/6276; G06N 3/045; G06N 3/08;
(Continued)

(56) References Cited

U.S. PATENT DOCUMENTS

2017/0206435 A1*  7/2017  Jin .................... G06K 9/628

OTHER PUBLICATIONS

Mao et al, "Deep Captioning with Multimodal Recurrent Neural Networks (m-RNN)", arXiv:1412v5, Jun. 11, 2015, 17 pages. (Year: 2015).*

(Continued)

*Primary Examiner* — Michael J Vanchy, Jr.
(74) *Attorney, Agent, or Firm* — Dority & Manning, P.A.

(57) ABSTRACT

Methods, systems, and apparatus, including computer programs encoded on a computer storage medium, for realizing a multimodal image classifier. In an aspect, a method includes, for each image of a plurality of images: processing the image by a textual generator model to obtain a set of phrases that are descriptive of the content of the image, wherein each phrase is one or more terms, processing the set of phrases by a textual embedding model to obtain an embedding of predicted text for the image, and processing the image using an image embedding model to obtain an embedding of image pixels of the image. Then a multimodal image classifier is trained on the embeddings of predicted text for the images and the embeddings of image pixels for the images to produce, as output, labels of an output taxonomy to classify an image based on the image as input.

14 Claims, 2 Drawing Sheets

(51) Int. Cl.
  *G06F 18/24* (2023.01)
  *G06F 18/214* (2023.01)
  *G06F 18/2413* (2023.01)

(58) Field of Classification Search
  CPC ........ G06N 20/00; G06N 3/044; G06N 3/084; G06F 16/532; G06F 16/5846; G06F 16/5866; G06F 18/214; G06F 18/24; G06F 18/24147; G06F 18/2431; G06Q 30/04; G06T 2207/20081; G06T 2207/20084; G06T 7/11; G06T 7/73; G06V 10/82; G06V 20/35; G06V 20/70; G06V 30/274; G06V 30/412
  See application file for complete search history.

(56) References Cited

OTHER PUBLICATIONS

Oura S, Matsukawa T, Suzuki E. Multimodal Deep Neural Network with Image Sequence Features for Video Captioning. In2018 International Joint Conference on Neural Networks (IJCNN) Jul. 8, 2018 (pp. 1-7). IEEE. (Year: 2018).*

Gu J, Wang G, Cai J, Chen T. An empirical study of language cnn for image captioning. InProceedings of the IEEE International Conference on Computer Vision 2017 (pp. 1222-1231). (Year: 2017).*

Devlin J, Gupta S, Girshick R, Mitchell M, Zitnick CL. Exploring nearest neighbor approaches for image captioning. arXiv preprint arXiv:1505.04467. May 17, 2015. (Year: 2015).*

M. Oujaoura, B. Minaoui and M. Fakir, "Combined descriptors and classifiers for automatic image annotation," 2014 International Conference on Multimedia Computing and Systems (ICMCS), Marrakech, Morocco, 2014, pp. 270-276 (Year: 2014).*

International Preliminary Report on Patentability for Application No. PCT/US2019/061950, dated May 27, 2021, 7 pages.

International Search Report for PCT/US2019/061950, dated Feb. 19, 2020, 2 pages.

Mao et al, "Deep Captioning with Multimodal Recurrent Neural Networks", arXiv:1412v5, Jun. 11, 2015, 17 pages.

Mnih et al, "Learning to Label Aerial Images from Noisy Data", International Conference on Machine Learning, 2012, 8 pages.

Wang et al, "Learning Two-Branch Neural Networks for Image-Text Matching Tasks", arXiv:1704v4, May 1, 2018, 14 pages.

\* cited by examiner

MULTIMODAL IMAGE CLASSIFIER USING TEXTUAL AND VISUAL EMBEDDINGS

PRIORITY CLAIM

The present application is a national stage filing under 35 U.S.C. § 371 of Patent Cooperation Treaty Application Serial No. PCT/US2019/061950, filed on Nov. 18, 2019, which claims the benefit of U.S. Patent Application Ser. No. 62/768,701, filed on Nov. 16, 2018. Applicant claims priority to and the benefit of each of such applications and incorporate all such applications herein by reference in their entirety.

BACKGROUND

This specification relates to image processing, and specifically to a multimodal image classifier.

Machine learned image classification models take image pixels as input and produce labels in a predefined taxonomy. Image classification is typically a supervised learning problem that defines a set of target classes (objects to identify in images), and trains a model to recognize them using training images that are labeled. Such systems are capable of high predictive accuracy and generalizability to unseen data. These models may rely on pixel data and features derived from the pixel data, such as color histograms, textures, and shapes, as training features.

SUMMARY

This specification describes a system implemented as computer programs on one or more computers in one or more locations that predicts an image classification using a model that takes features from an embedding of predicted text for an image and an embedding of the image pixels of the image. The specification also describes a method performed by one or more data processing apparatus for predicting an image classification and one or more non-transitory computer storage media storing instructions that when executed by one or more computers cause the one or more computers to perform operations for predicting image classification.

According to an aspect there is provided a method including for each image of a plurality of images: processing the image by a textual generator model to obtain a set of phrases that are descriptive of the content of the image, wherein each phrase is one or more terms, processing the set of phrases by a textual embedding model to obtain an embedding of predicted text for the image, and processing the image using an image embedding model to obtain an embedding of image pixels of the image; and training a multimodal image classifier on the embeddings of predicted text for the images and the embeddings of image pixels for the images to produce, as output, labels of an output taxonomy to classify an image based on the image as input. Additional aspects can be provided in apparatus, systems, and computer program products.

Particular embodiments of the subject matter described in this specification can be implemented to realize one or more of the following advantages. While textual information (e.g., text surrounding an image) can provide valuable orthogonal signals, machine learned models typically rely on pixel data as input. Moreover, textual data may not be available for a corpus of images. The novel features of this disclosure include the generation of a textual embedding for an image from phrases generated by a text generator that does not need surrounding text as input. A multimodal image classifier is then trained on the textual embeddings and pixel embeddings of images. The use of the textual embedding for training leads to an overall performance that is better than an overall performance of a model that is trained without the textual embedding, resulting in a significant improvement in the field of image classification.

Moreover, systems and methods described herein may provide language agnostic and cross lingual text embedding. This may be achieved, for example, due to the training on query-image pairs.

Additionally or alternatively, the systems and methods described herein may allow for the characterization of both individual local characteristics and general visual structures. This can be achieved, for example, by training network weights on an input dataset, identifying a bottleneck layer, and extracting outputs of that layer for arbitrary images.

This disclosure may also provide a system framework (and associated method) that only requires input images to produce predictions that are based, in part, on textual features. For example, by concatenating an N-dimensional textual feature vector with an M-dimensional visual feature vector for images, the systems and methods described herein allow for a singular feature vector representing both concepts.

Systems and methods described herein may also allow a probability distribution to be produced across each possible predicted phrase. For example, a softmax layer may be used to produce a probability distribution across a large number of queries.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This patent document describes a framework that includes a text generator that generates textual labels, referred to as phrases, from image data, and a multimodal image classifier that takes textual features from the text generator and visual features from the image pixels, and produces labels according to an output taxonomy. In some implementations, the text generator is trained using web-based query/image pairs to incorporate contextual information associated with each image. The output of the text generator, in some implementations, may exceed the output taxonomy of the image classifier, e.g., the text generator may generate phrases that are not included in the output taxonomy of the multimodal image classifier.

These features and other features are described in more detail below.

Figure 1:
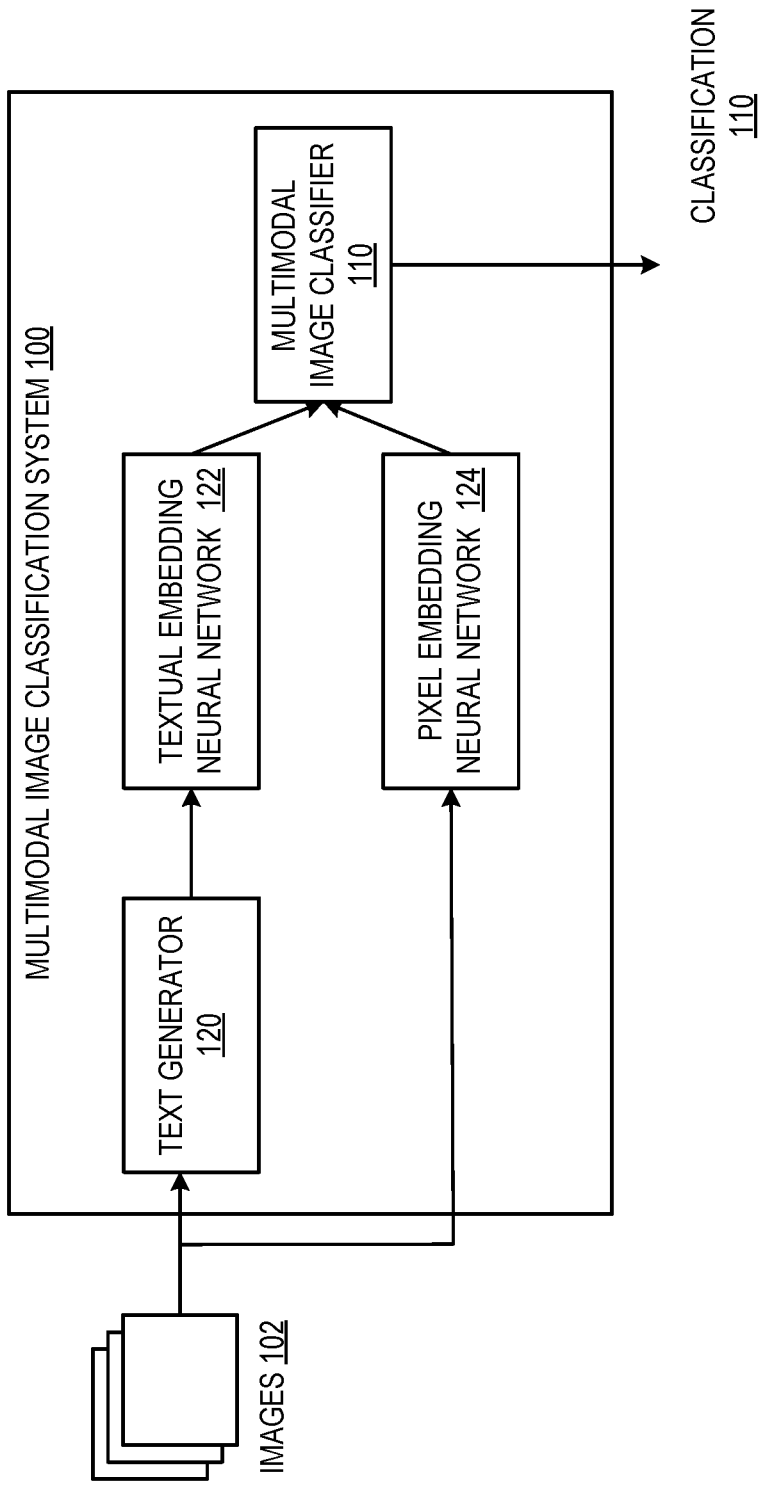
FIG. 1 is an illustration of a multimodal image classification system.

FIG. 1 is an illustration of a multimodal image classification system 100. The multimodal image classification system 100 is an example of a system implemented as computer programs on one or more computers in one or more locations in which the systems, components, and techniques described below are implemented.

The multimodal image classification system 100 is configured to process images to generate textual embeddings and image pixel embeddings that are used to train a multimodal image classification model 110. The system 100 includes a text generator 120 and a textual embedding neural network 122. The text generator 120 generates, for each image of images 102, phrases of one or more terms that are descriptive of content of the image. The textual embedding neural network 122 processes the phrases generated by the text generator for the images and generates a textual embedding.

In some implementations, the text generator 100 is a neural network trained on web-based query-image pairs. The query-image pairs are images paired with respective queries for which the images were selected by users.

In some implementations, long-tail queries are included in the query-image pairs. This results in fine-grained and descriptive queries, e.g., [2016 lamborghini aventador white], [equestrian statue of bartolomeo Colleoni], and the like. The query-image pair space also covers multiple visual concepts, including landmarks, animals, to man-made products, persons, artwork, etc. This results in a technical improvement in accuracy over systems trained on image datasets that have a much smaller vocabulary size and/or less descriptive phrases, e.g., [golden retriever] in a limited image domain, e.g., "dog."

In some implementations, the text generator 120 is a convolutional neural network with classification loss. One example architecture is ResNet-101 based, followed by an embedding layer projecting ResNet response to a low-dimensional vector, and a multi-way softmax at the top. In one example implementation, the vector has M dimensions, and is followed by a K million-way softmax. In some implementations, M is 64, and K is 40 million. Other values can also be used, however.

In this particular example, a feature of the text generator network 120 is its ability to predict a large number of queries (e.g., 40 million) from input images. In order to accommodate this large output space, the Resnet output is reduced to the 64-dimensional bottleneck layer. The network 120 can thus be conceptualized as containing three stages: the primary training mechanism of learned weights and biases, a 64-dimensional feature layer representing image embeddings, and a softmax layer that produces a probability distribution across the 40 million queries.

In this example architecture, at inference time, 64-dimensional embeddings are generated for each input image, and the top N most probable queries and their associated similarity scores are extracted from the query embedding index. In some implementations, N=3, but other values of N can also be used. As queries represent contextual information, this process identifies relevant text for arbitrary images without web dependence. Furthermore, the embeddings additionally yield a way to measure image to image similarity in query space.

For large scale training, an AI accelerator application specific circuit, such as a Tensor Processing Unit, and a sampled softmax loss algorithm is used. Other appropriate training pipelines can also be used, however, and the particular pipeline used may depend on the scale of the training corpus.

In some implementations, after training, a predicted probability of a query $q_c$ is computed by the softmax function:

$$p_c = \frac{\exp(-d(w_c, x))}{\sum_i \exp(-d(w_i, x))} \quad \text{Equation (1)}$$

where x is the image embedding (e.g., from a bottleneck layer), $w_c$ are the weights from the fully connected layer after the bottleneck layer that correspond to the query $q_c$ among K million queries, and $d(\cdot, \cdot)$ is a distance function, such as a cosine distance function. Use of this function is optional and other ways of predicting a probability for a query can also be used, however.

To further increase the vocabulary of the predicted phrases from the phrase generation model, in some implementations a prototypical network approach may be adopted to construct prototypes of a significantly larger number of queries. Increasing the vocabulary by this process is optional. Prototypical networks compute an M-dimensional representation $c_k \in \mathbb{R}^M$, or prototype, of each class through an embedding function $f_\phi: \mathbb{R}^D \to \mathbb{R}^M$ with learnable parameters $\phi$. In some implementations, the prototype $\phi_c$ of each query c is defined as the mean vector of the embeddings of the images associated with that query:

$$\phi_c = \frac{1}{|S_c|} \sum_{i \in S_c} x_i \quad \text{(Equation 2)}$$

where $S_c$ is the set of images that are associated with query c. The prototypes can be obtained using other approaches as well. The weights $w_c$ of equation (1) can be replaced by $\phi_c$ to increase the output size from K to a much larger output space of the phrase generation model. In some implementations, K is 40 million. Other ways of increasing the output space can also be used.

In some implementations, prediction of the top related queries (phrases) for a given image can be done more efficiently by use of a nearest-neighbor process. Because many queries in the output space may be irrelevant to a given image, it is unnecessary to compute their softmax probability to retrieve the top queries. Thus, in some implementations, the system utilizes a top-k nearest neighbor search technique for phrase generation:

$$q_c^* = \arg\min_c (d(\phi_c, x)). \quad \text{Equation (3)}$$

The text generator 120 realizes several advantages, including the ability to distinguish very fine-grained concepts for images. e.g., [2016 Lamborghini Aventador white] and [2010 Lamborghini Aventador white], as compared to [white Lamborghini]. Such fine-grained concepts for images are derived from long-tail queries from query image pairs. Additionally, the resulting textual embedding is language agnostic and cross lingual due to the training on query-image pairs.

The textual embedding neural network 122 is an artificial neural network that is trained to map a discrete input (e.g., a feature vector of the phrases generated by the text generator 120) to a continuously valued output (e.g., a vector or matrix). The outputs of the textual embedding neural network 122 have the property that similar inputs are mapped to outputs that are close to one another in multi-dimensional space. The output of the textual embedding neural network 122 can thus be described as a latent representation of the data that is input to the embedding neural network. In this specification, a latent representation of a set of data refers to a numerical representation of the data (e.g., as a vector or matrix) which is generated internally by a network.

In an example implementation, the textual embedding network 122 is a Siamese network that is pre-trained on a dataset of query-query associations. A Siamese network is an artificial neural network that uses the same weights while working in tandem on two different input vectors to compute comparable output vectors To improve embedding quality, attention mechanisms may optionally be used. The resulting embeddings have the property that related queries are situated close together in the output embedding space.

The embedding model is subsequently utilized to embed the top N text results obtained from the text generator 120. In some implementations, the text embedding are obtained via a bag-of-words model of unigrams and bigrams. The embeddings for the top N query (or text predictions) are subsequently averaged, resulting in an M-dimensional textual feature vector. In some implementations, N is 3 and M is 200. Other values can also be used, however.

At this processing stage, the system has generated an embedding from a network trained on textual signals (query-query associations) that represents an image for which the system was initially given solely pixels as input. The independent textual embedding of the generated text queries thus bridges the gap between the visual and textual modalities.

The pixel embedding neural network 124 generates embeddings with properties similar to the embeddings of the textual embedding neural network 122, i.e., the outputs of the pixel embedding neural network 124 have the property that similar inputs are mapped to outputs that are close to one another in multi-dimensional space. In some implementations, the embeddings for image features were obtained from a bottleneck layer of a pre-trained convolutional network. This involves training network weights on an input dataset, identifying the bottleneck layer (usually the layer prior to outputs), and extracting outputs of that layer for arbitrary images. In this way, features characterizing individual local characteristics and general visual structures are obtained.

The multimodal image classifier 110 receives the textual embeddings from the textual embedding neural network 122 and the pixel embeddings from the pixel embedding neural network 124. The classifier is trained on these embeddings to produce, as output, labels of an output taxonomy to classify an image based on the image as input. Having obtained pixel and textual embeddings for arbitrary input images, the embeddings are subsequently combined to generate representations for images that incorporate both types of features. In some implementation, the process for combining these features involved concatenating the 200-dimensional textual feature vector with 1024-dimensional visual feature vector into a singular feature vector representing both concepts. The resulting vector is subsequently input to a two-stage fully connected neural network, with the output softmax layer predicting probabilities associated with classes according to a specified taxonomy. Other appropriate training procedures can also be used, however.

Advantageously, while orthogonal textual features are extracted to supplement pixel information and generate context-aware predictions, the system 100 only requires images to generate label-wise outcomes. Since the generation of text with text generator 120 enables the identification of relevant text for arbitrary input images, the system framework only requires input images to produce predictions that are based, in part, on textual features. This is yet another technical improvement in the field of image classification.

Figure 2:
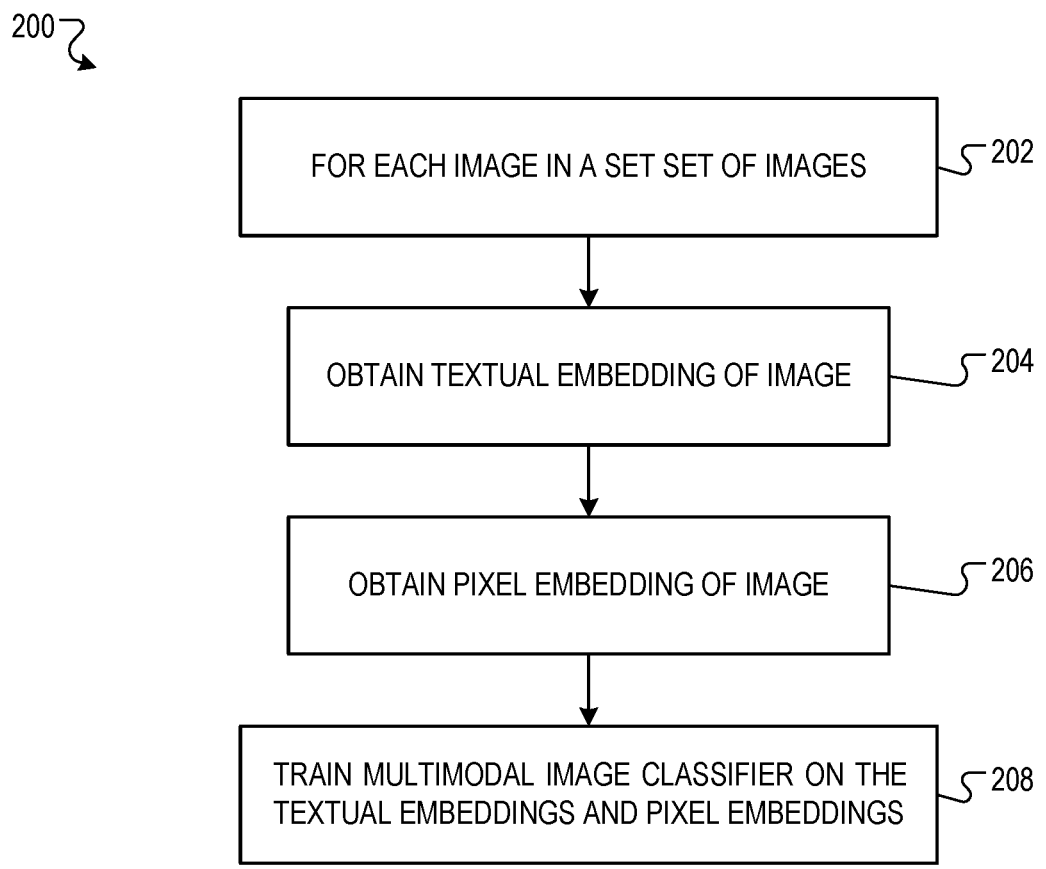
FIG. 2 is a flow diagram of an example process for training a multimodal image classifier.

FIG. 2 is a flow diagram of an example process 200 for training a multimodal image classifier. The process 200 can be implement in one or more computers in one or more locations.

The process 200, for each image in a set of images, (202), obtains a textual embedding of the image (204) and obtains a pixel embedding of the image (206). For example, as described above, a textual embedding for each image may be obtained by processing the image by the text generator 120, and processing the output phrases (text or queries) by the textual embedding neural network 122. The pixel embedding for each image may be obtained by processing he image by the pixel embedding neural network 124.

The process 200 then trains a multimodal image classifier using the textual embeddings and the pixel embeddings (208). As described above, the classifier is trained on these embeddings to produce, as output, labels of an output taxonomy to classify an image based on the image as input. Once both visual and textual embeddings are generated, multimodal image classifier 110 fuses both signals to produce the final image classification. As describe above, the input, in some implementations, is the concatenation of features from the 1024-dimensional visual embedding and the 200-dimensional textual embedding. The resulting vector is input to a multi-stage fully connected neural network, with the output softmax layer predicting probabilities associated with classes according to the target taxonomy.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   for each image of a plurality of images:
      processing pixels of the image by a textual generator model to obtain a set of phrases that are descriptive of the content of the image, wherein each phrase is one or more terms, wherein processing the pixels of the image by the textual generator model comprises:
         receiving a plurality of outputs from a convolutional neural network of the textual generator model, each output of the plurality of outputs representing a possible query associated with the image;
         projecting each output of the plurality of outputs to a low-dimensional vector, the low-dimensional vector representing an image embedding associated with a respective output;
         producing a probability distribution for the plurality of outputs based on the low-dimensional vector associated with each output of the plurality of outputs, the probability distribution indicating an image-to-image similarity score for each output of the plurality of outputs; and
         selecting a top-N most probable queries and associated similarity scores as the set of phrases to be obtained;
      processing the set of phrases by a textual embedding model to obtain an embedding of predicted text for the image; and
      processing the image using an image embedding model to obtain an embedding of image pixels of the image;
   training a multimodal image classifier on the embeddings of predicted text for the images and the embeddings of image pixels for the images to produce, as output, labels of the output taxonomy to classify an image based on the image as input.

2. The method of claim 1, wherein the textual generator model is a textual query based model trained on textual query-image pairs.

3. The method of claim 1, wherein processing the image using an image embedding model to obtain an embedding of image pixels of the image comprises obtaining image features from a final fully connected layer of a pre-trained convolutional network.

4. The method of claim 1, wherein training the multimodal image classifier comprises:
   concatenating an N-dimensional textual feature vector with M-dimensional visual feature vector into a singular feature vector; and
   providing, as input to the multi-modal classifier, the singular feature vector.

5. The method of claim 1, wherein selecting the top-N most probable queries and associated similarity scores as the set of phrases to be obtained comprises selecting the top-N most probable queries using a nearest-neighbor process.

6. A system, comprising:
   a data processing apparatus;
   a memory in data communication with the data processing apparatus and storing instructions that cause the data processing apparatus to perform operations comprising:
      for each image of a plurality of images:
         processing pixels of the image by a textual generator model to obtain a set of phrases that are descriptive of the content of the image, wherein each phrase is one or more terms, wherein processing the pixels of the image by the textual generator model comprises:
            receiving a plurality of outputs from a convolutional neural network of the textual generator model, each output of the plurality of outputs representing a possible query associated with the image;
            projecting each output of the plurality of outputs to a low-dimensional vector, the low-dimensional vector representing an image embedding associated with a respective output;
            producing a probability distribution for the plurality of outputs based on the low-dimensional vector associated with each output of the plurality of outputs, the probability distribution indicating an image-to-image similarity score for each output of the plurality of outputs; and
            selecting a top-N most probable queries and associated similarity scores as the set of phrases to be obtained;
         processing the set of phrases by a textual embedding model to obtain an embedding of predicted text for the image; and
         processing the image using an image embedding model to obtain an embedding of image pixels of the image;
      training a multimodal image classifier on the embeddings of predicted text for the images and the embeddings of image pixels for the images to produce, as output, labels of the output taxonomy to classify an image based on the image as input.

7. The system of claim 6, wherein the textual generator model is a textual query based model trained on textual query-image pairs.

8. The system of claim 6, wherein processing the image using an image embedding model to obtain an embedding of image pixels of the image comprises obtaining image features from a final fully connected layer of a pre-trained convolutional network.

9. The system of claim 6, wherein training the multimodal image classifier comprises:
concatenating an N-dimensional textual feature vector with M-dimensional visual feature vector into a singular feature vector; and
providing, as input to the multi-modal classifier, the singular feature vector.

10. The system of claim 6, wherein selecting the top-N most probable queries and associated similarity scores as the set of phrases to be obtained comprises selecting the top-N most probable queries using a nearest-neighbor process.

11. One or more non-transitory computer storage media storing instructions that when executed by one or more computers cause the one or more computers to perform operations comprising:
for each image of a plurality of images:
processing pixels of the image by a textual generator model to obtain a set of phrases that are descriptive of the content of the image, wherein each phrase is one or more terms, wherein processing the pixels of the image by the textual generator model comprises:
receiving a plurality of outputs from a convolutional neural network of the textual generator model, each output of the plurality of outputs representing a possible query associated with the image;
projecting each output of the plurality of outputs to a low-dimensional vector, the low-dimensional vector representing an image embedding associated with a respective output;
producing a probability distribution for the plurality of outputs based on the low-dimensional vector associated with each output of the plurality of outputs, the probability distribution indicating an image-to-image similarity score for each output of the plurality of outputs; and
selecting a top-N most probable queries and associated similarity scores as the set of phrases to be obtained;
processing the set of phrases by a textual embedding model to obtain an embedding of predicted text for the image; and
processing the image using an image embedding model to obtain an embedding of image pixels of the image;
training a multimodal image classifier on the embeddings of predicted text for the images and the embeddings of image pixels for the images to produce, as output, labels of the output taxonomy to classify an image based on the image as input.

12. The one or more non-transitory computer storage media of claim 11, wherein the textual generator model is a textual query based model trained on textual query-image pairs.

13. The one or more non-transitory computer storage media of claim 11, wherein processing the image using an image embedding model to obtain an embedding of image pixels of the image comprises obtaining image features from a final fully connected layer of a pre trained convolutional network.

14. The one or more non-transitory computer storage media of claim 11, wherein training the multimodal image classifier comprises:
concatenating an N-dimensional textual feature vector with M-dimensional visual feature vector into a singular feature vector; and
providing, as input to the multi-modal classifier, the singular feature vector.

* * * * *